US009218447B2

(12) United States Patent
Basu et al.

(10) Patent No.: US 9,218,447 B2
(45) Date of Patent: Dec. 22, 2015

(54) AUTOMATIC TEST PATTERN GENERATION (ATPG) CONSIDERING CROSSTALK EFFECTS

(71) Applicant: International Business Machines Corporation, Armonk, NY (US)

(72) Inventors: Kanad Basu, Bangalore (IN); Raghu Gaurav GopalaKrishnaSetty, Bangalore (IN); Hari Krishnan Rajeev, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 14/152,537

(22) Filed: Jan. 10, 2014

(65) Prior Publication Data

US 2015/0199466 A1  Jul. 16, 2015

(51) Int. Cl.
    *G06F 17/50* (2006.01)
(52) U.S. Cl.
    CPC ........ *G06F 17/5081* (2013.01); *G06F 2217/82* (2013.01)
(58) Field of Classification Search
    CPC ............ G06F 17/5077; G06F 17/5022; G06F 17/5036; G06F 17/5081; G06F 2217/82
    USPC ................................. 716/110–117
    See application file for complete search history.

(56) References Cited

U.S. PATENT DOCUMENTS

| 6,907,590 B1 | 6/2005 | Al-Dabagh et al. |
| 2002/0079557 A1 | 6/2002 | Ahn et al. |
| 2003/0099014 A1 | 5/2003 | Egner et al. |
| 2004/0099878 A1 | 5/2004 | Huang et al. |
| 2007/0064923 A1* | 3/2007 | Schmukler et al. ........ 379/406.1 |
| 2007/0188188 A1 | 8/2007 | Or-Bach et al. |
| 2009/0063062 A1 | 3/2009 | Takamatsu et al. |
| 2009/0210183 A1 | 8/2009 | Rajski et al. |
| 2009/0235133 A1 | 9/2009 | Kapur et al. |
| 2010/0218152 A1* | 8/2010 | Tehrani et al. .................... 716/6 |
| 2010/0226241 A1 | 9/2010 | Schmatz et al. |
| 2011/0246997 A1 | 10/2011 | Sitaraman et al. |
| 2012/0123724 A1 | 5/2012 | Buechner et al. |
| 2012/0173924 A1 | 7/2012 | Xiao et al. |

FOREIGN PATENT DOCUMENTS

| JP | 405082646 | 4/1993 |
| WO | 03038792 | 5/2003 |

OTHER PUBLICATIONS

Yi Zhao et al., "Fault-Coverage Analysis Techniques of Crosstalk in Chip Interconnects", IEEE Transactions on Computer-Aided Design of Integrated Circuits and Systems, vol. 22, No. 6, Jun. 2003.

(Continued)

*Primary Examiner* — Binh Tat

(74) *Attorney, Agent, or Firm* — Stevens J. Meyers; Hoffman Warnick LLC

(57) ABSTRACT

Crosstalk effects can be taken into account in automatic test pattern generation (ATPG) by providing crosstalk fault models, determining paths and/or nodes to be sensitized to activate each crosstalk fault, and optimizing to enable as many crosstalk faults as possible with a given pattern, subject to constraints. Constraints can include threshold numbers of endpoints/observation points and/or attempts to sensitize. Intermediate nodes in a crosstalk fault model path to an observation point can also be determined and/or sensitized.

20 Claims, 7 Drawing Sheets

(56) References Cited

OTHER PUBLICATIONS

Kunal P. et al., "On ATPG for Multiple Aggressor Crosstalk Faults in Presence of Gate Delays", Test Conference, 2007. ITC 2007. IEEE International.

Sujit T Zachariah et al., "On Modeling Cross-Talk Faults", © 2003 IEEE.

Alodeep Sanyal et al., "A Study on Impact of Loading Effect on Capacitive Crosstalk Noise", © 2009 IEEE.

Kunal Ganeshpure et al., "An ILP Based ATPG Technique for Multiple Aggressor Crosstalk Faults Considering the Effects of Gate Delays", 2009 22nd International Conference on VLSI Design.

* cited by examiner

AUTOMATIC TEST PATTERN GENERATION (ATPG) CONSIDERING CROSSTALK EFFECTS

BACKGROUND

The present invention relates to microfabrication of semiconductor devices, and, more specifically, to methods for taking into account signal integrity in the automatic generation of test patterns for semiconductor devices and/or semiconductor device manufacture.

Semiconductor devices and components thereof continue to decrease in size, resulting in increasing circuit density. As a result, the effect of crosstalk defects has emerged as a factor to consider during manufacturing testing of a chip. Crosstalk faults can arise when two lines in a circuit are so close that their parasitic capacitances influence their signal states. A decrease in feature size can increase parasitic capacitance so that the effect of a crosstalk fault can become more prominent. When this coupling capacitance exceeds a certain threshold value, the state of one signal will influence the other if there are transitions on either or both lines. If there is a transition on only one line, a crosstalk glitch is produced; on the other hand, transitions on both lines result in a crosstalk delay. It should be noted that crosstalk faults are different from bridging faults, which can also arise when two lines are in close proximity. However, the cause of bridging faults is a resistive connection between the two lines and not capacitive. Also, the effects of the two faults are different: bridging faults result in wired-AND and wired-OR logic functions, thus incurring a stuck-at defect on a signal, whereas crosstalk faults result in glitch or delay.

SUMMARY

According to one embodiment of the present invention, a method of automatically generating test patterns for a semiconductor device design to detect crosstalk induced faults can include generating a list of aggressor-victim (AV) pairs of nets of a design that exceed a threshold value of a crosstalk effect criterion, each AV pair including an aggressor net and a victim net. Each AV pair can be translated into a respective AV crosstalk fault model, and an automated test pattern (ATP) can be generated based on the design and including at least one constraint configured to switch at least one AV crosstalk fault model. At least one care bit configured to propagate at least one AV crosstalk fault to an observation node can be generated, and each AV crosstalk fault model and a respective path to the observation node can be sensitized. It can be determined whether any crosstalk fault is observed and a number of crosstalk faults observed, and the generating of the ATP, the generating of the at least one care bit, the sensitizing, and the determining can be repeated until at least one of a desired number of faults is observed or a maximum number of repetitions has been completed, each repetition of the generating of the ATP producing a different pattern.

Another embodiment of the invention disclosed herein can include a computer program product for detecting crosstalk related transition faults in a semiconductor design, the computer program product being stored on a non-transitory computer readable storage medium and including instructions in the form of computer readable code. When executed by a computing device, the computer program product can configure the computing device to extract a respective parasitic capacitance for every net in the design, generate a list of aggressor-victim (AV) pairs of nets each exhibiting a high degree of signal cross talk based on a first criteria set, and translate each AV pair into a respective AV fault model configured to model at least one of a crosstalk setup fault, a hold violation fault, and a value change fault. Any intermediate circuit node to be switched to observe crosstalk faults can be identified, and an automated test pattern can be generated accounting for circuit constraints to sensitize aggressor/victim pairs selected for switching. Care bits to propagate the crosstalk faults to an observation node can be generated, and each one of the plurality of aggressor/victim pairs and a corresponding victim to observation path can be sensitized iteratively to detect the crosstalk fault. A set of patterns generated for each one of the plurality of aggressor/victim pairs can be selected with an optimized algorithm to detect a maximum number of crosstalk faults.

An additional embodiment of the invention disclosed herein can take the form of a system for detecting crosstalk related transition faults in a semiconductor design, the system including at least one computing device connected to a non-transitory computer readable storage medium on which instructions in the form of computer readable code reside. When the instructions and/or computer readable code is executed by a computing device, the system can be configured to extract a respective parasitic capacitance for every net in the design, generate a list of aggressor-victim (AV) pairs of nets each exhibiting a high degree of signal cross talk based on a first criteria set, and translate each AV pair into a respective AV fault model configured to model at least one of a crosstalk setup fault, a crosstalk hold violation fault, and a crosstalk value change fault. Any intermediate circuit node that switched to observe crosstalk faults can be identified, and an automated test pattern can be generated accounting for circuit constraints to sensitize aggressor/victim pairs selected for switching. Care bits can be generated to propagate the crosstalk faults to an observation node, and each one of the plurality of aggressor/victim pairs and a corresponding victim to observation path can be sensitized iteratively to detect the crosstalk fault. A set of patterns generated for each one of the plurality of aggressor/victim pairs can be selected with an optimized algorithm to detect a maximum number of crosstalk faults.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Existing transition fault testing techniques include lumped delay defect testing countered by transition testing, distributed delay defect testing countered by path test, and small delay defects. However, none of these techniques address and/or take into account crosstalk faults.

Figure 1:
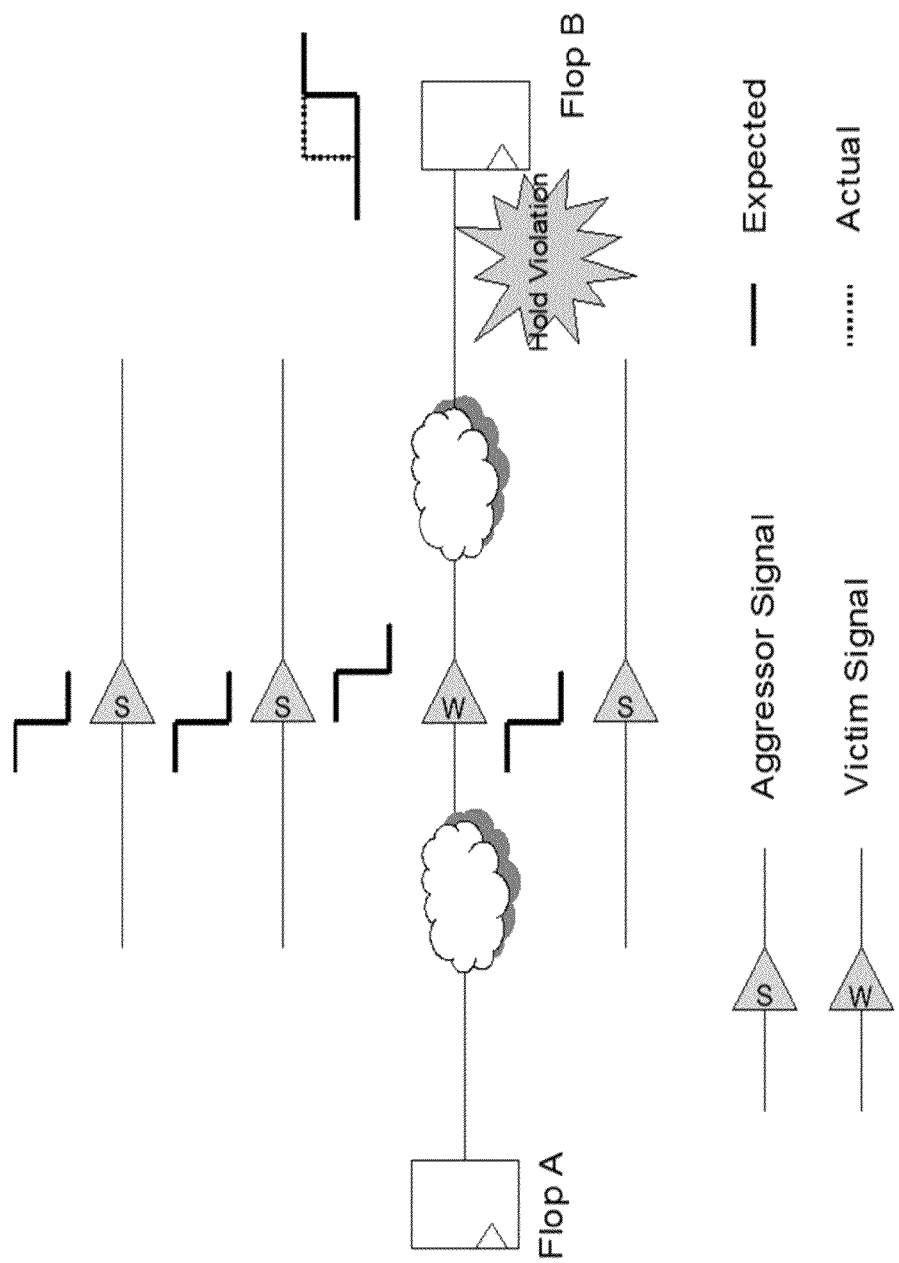
FIG. 1 is a schematic block diagram illustrating a crosstalk setup fault that can be addressed according to embodiments of the invention disclosed herein.
Figure 2:
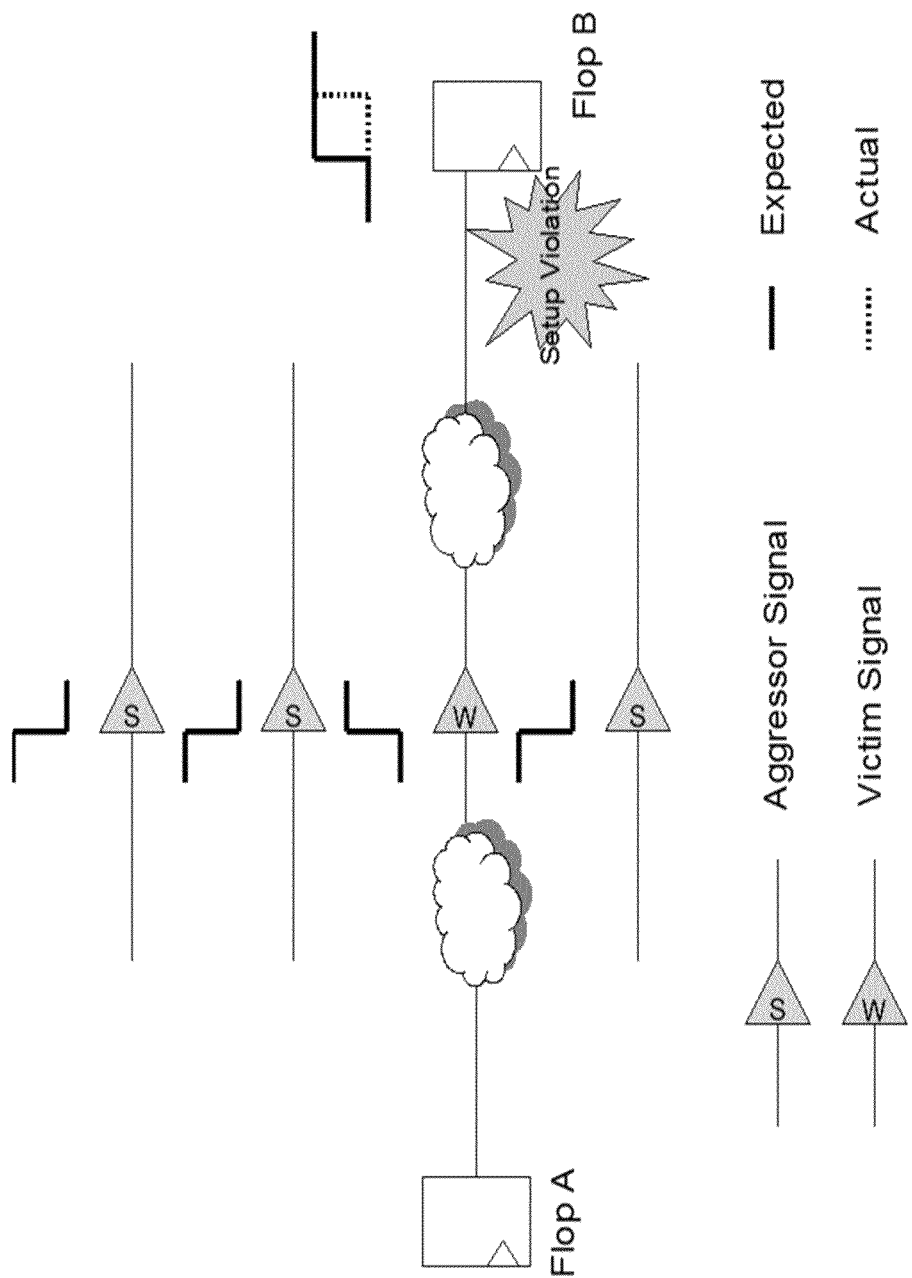
FIG. 2 is a schematic block diagram illustrating a crosstalk hold fault that can be addressed according to embodiments of the invention disclosed herein.

Crosstalk faults are typically studied using aggressor-victim models. An affected line or net is typically designated as a victim, while any influencing line or net is typically designated as an aggressor. Together, the aggressor(s) and the victim can be called an AV pair. In many situations, there can be multiple aggressors for a single victim and/or multiple victims for a single aggressor. In the case of crosstalk delay, a negative delay can be caused when both an aggressor signal and a victim signal are transiting in the same direction; a negative delay results when the transition direction is opposite. These delays can result in setup and/or hold violation if the victim falls in a path between two flops. For example, FIG. 1 shows two flops A and B, here aggressors, and a victim between the flops. If three aggressors affect the line, then if all the aggressor signals undergo a 1 to 0 transition and the victim signal is transiting from 0 to 1, there will be a setup violation at B. The actual delay effect is shown in FIG. 2, where it can be seen that the victim transits at a $\Delta t$ after the actual scheduled transition time, which results in a setup violation.

Embodiments of the invention disclosed herein can provide an efficient automatic test pattern generation (ATPG) method that can activate transitions on the aggressor(s) and the victim of an AV pair while also considering delay testing. Current techniques for multi-aggressor/victim focus on activation of the various aggressors so that the cross-talk fault is activated and typically do not deal with fault propagation, that is, observation of the cross-talk effect. A delay defect, like any timing error, should be propagated to a flip-flop for detection.

Broadly, embodiments of the invention disclosed herein can be implemented as a method of automatically generating test patterns for a semiconductor device designed to detect crosstalk induced faults, as will be additionally explained below using a particular example shown in FIG. 6. A list of aggressor-victim (AV) pairs of nets of a design can be generated based on a crosstalk effect criterion. Any pair of nets that exceeds a threshold value of the crosstalk effect criterion can be designated an AV pair and added to the list, each AV pair including an aggressor net and a victim net. Each crosstalk effect criterion can include, for example, parasitic capacitance, and the generating of the list of AV pairs can include obtaining a respective parasitic capacitance for each net of a design, the design including at least two nets. A respective degree of a crosstalk effect between each pair of nets can be determined based on the parasitic capacitance, and any net pair exceeding a threshold value of parasitic capacitance can be added to the list as an AV pair. While parasitic capacitance is used as a crosstalk effect criterion by way of example, it should be understood that any suitable criterion can be used, such as relative coupling capacitance between nets, 3D coupling between dies, relative physical distance between nets, trace length along which lines of nets run together, timing, and/or driver strength threshold.

Figure 3:
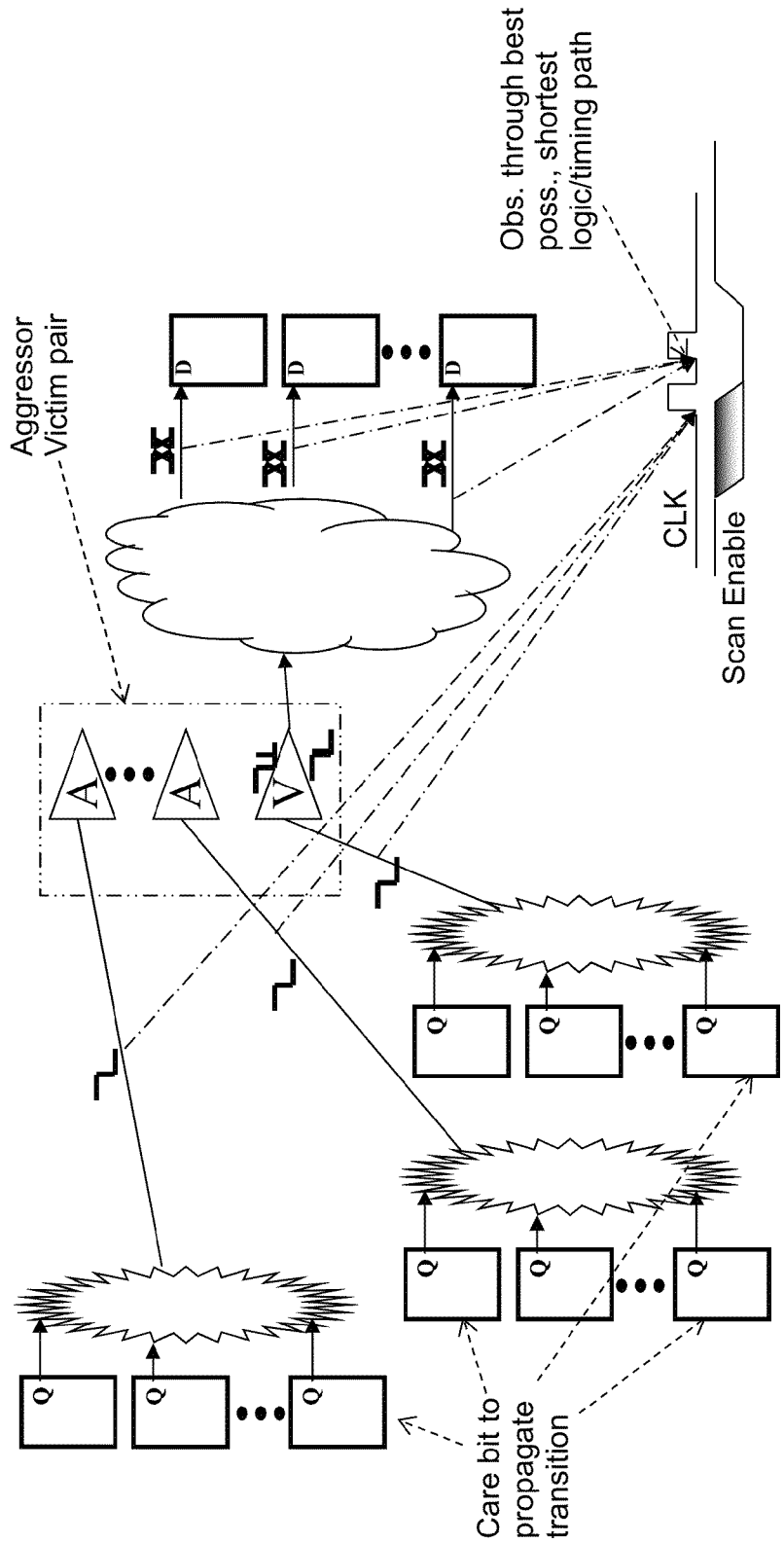
FIG. 3 is a schematic block diagram illustrating a crosstalk hold fault model according to embodiments of the invention disclosed herein.
Figure 4:
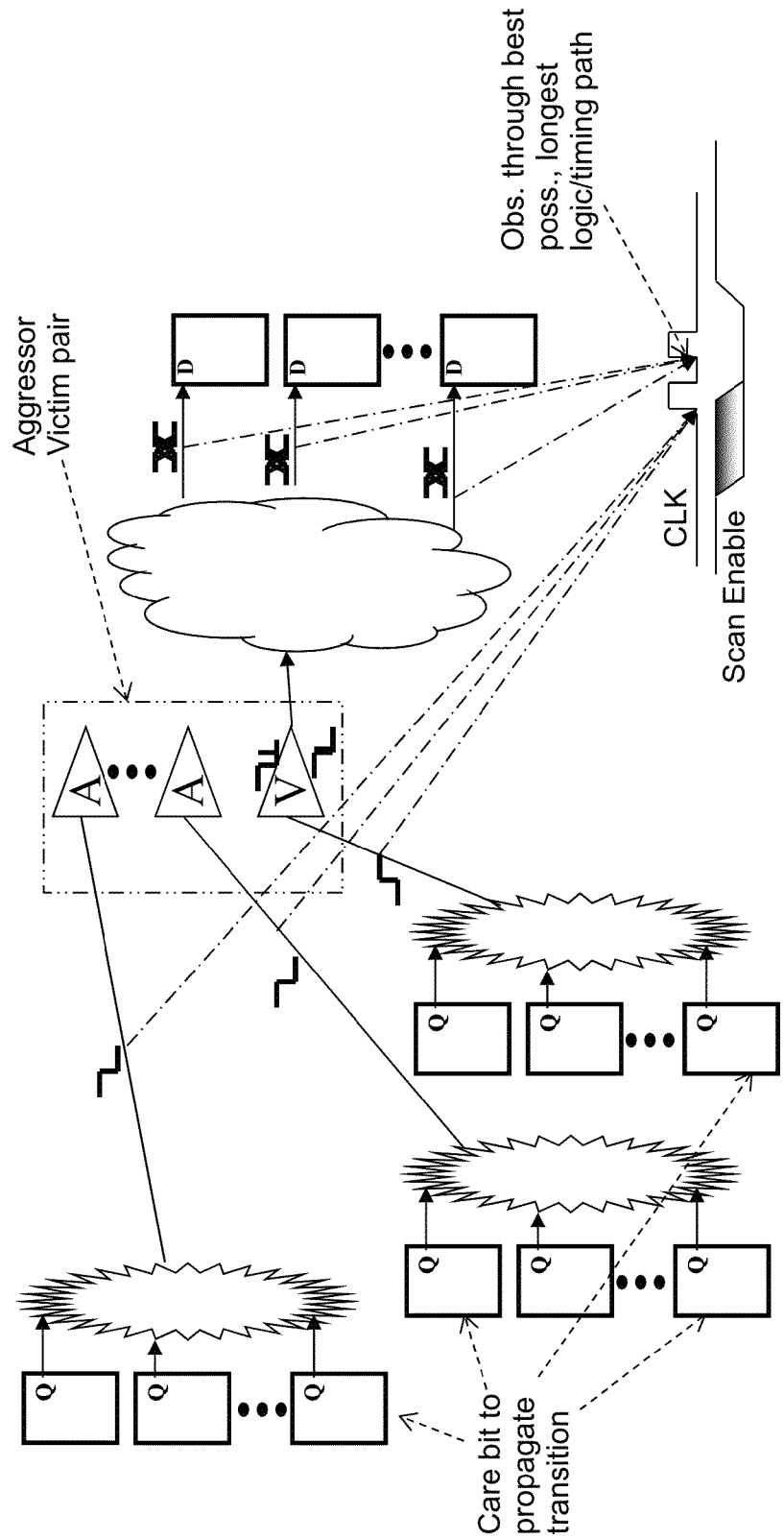
FIG. 4 is a schematic block diagram illustrating a crosstalk setup fault model according to embodiments of the invention disclosed herein.
Figure 5:
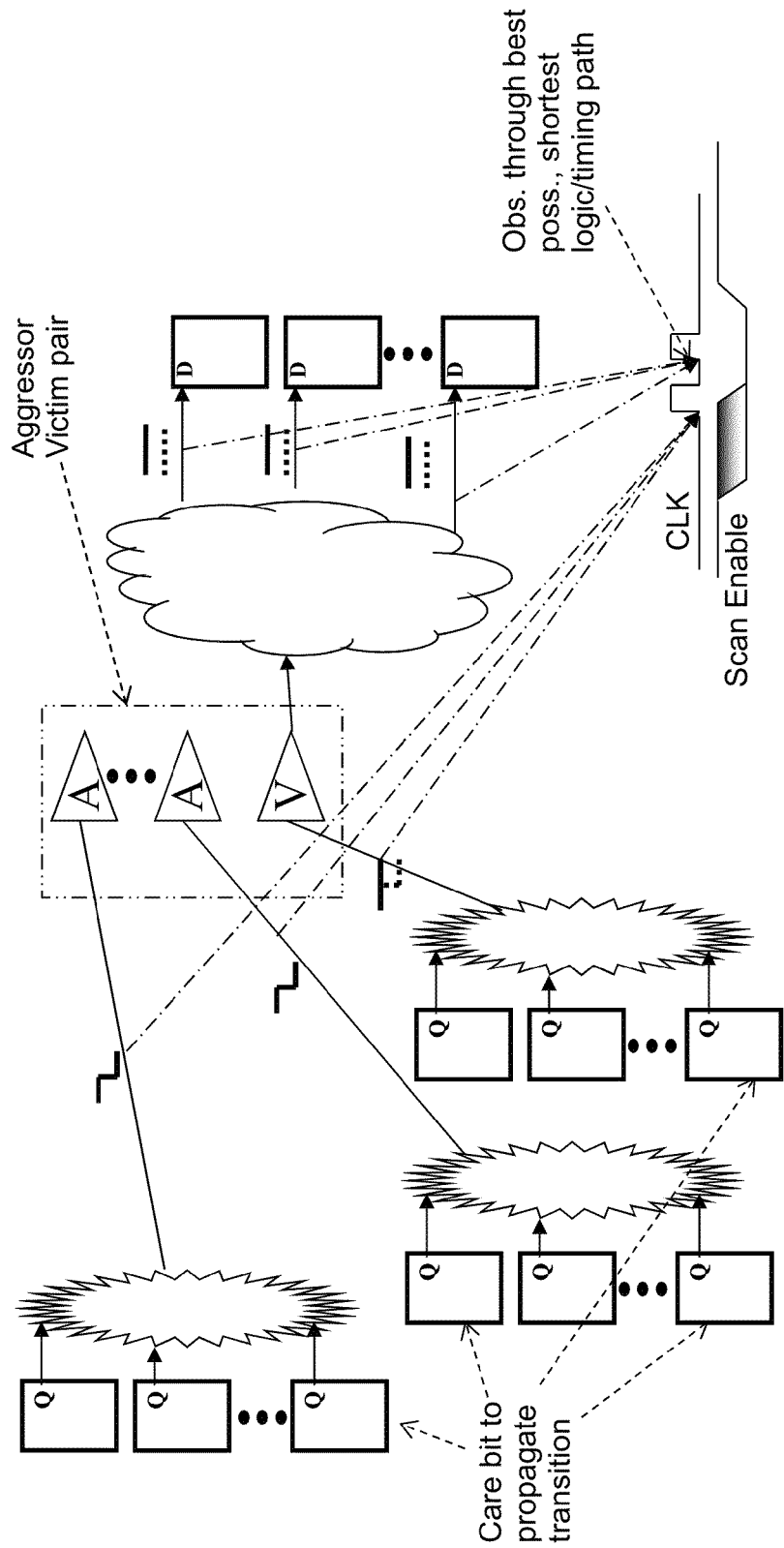
FIG. 5 is a schematic block diagram illustrating a crosstalk value change fault model according to embodiments of the invention disclosed herein.

Each AV pair can be translated into a respective AV crosstalk fault model, which can be configured to model, for example, an AV crosstalk hold fault, an AV crosstalk setup violation, and/or an AV crosstalk value change fault. For an AV crosstalk hold fault, as illustrated in FIG. 3, an AV crosstalk fault model can be configured to produce with each aggressor net and each victim net of the respective AV pair a respective signal transitioning in a first direction. For example, where each aggressor is modeled with a signal transitioning from zero to one, each victim is also modeled with a signal transitioning from zero to one, and where each aggressor is modeled with a signal transitioning from one to zero, each victim is also modeled with a signal transitioning from one to zero. By contrast, for an AV crosstalk setup violation, as seen in FIG. 4, if each aggressor is modeled with a signal transitioning from zero to one, each victim is modeled with a signal transitioning from one to zero, and where each aggressor is modeled with a signal transitioning from one to zero, each victim is modeled with a signal transitioning from zero to one. For a crosstalk value change fault, as shown in FIG. 5, the aggressor(s) can be modeled with a signal either steady state or transitioning, and the victim(s) can be modeled with a signal the other of steady or transitioning.

An automated test pattern (ATP) can be generated based on the design and including at least one constraint configured to switch at least one AV crosstalk fault model. A path between each AV crosstalk fault model and an observation node can be identified, and any intermediate circuit node on a path that should be switched to observe a crosstalk fault can be identified. At least one care bit can be generated, each care bit being configured to propagate at least one AV crosstalk fault to an observation node, such as an output or a flop at an end of a path. Each AV crosstalk fault model and its respective path to the observation node can be sensitized, and if any crosstalk fault is observed at the output node, a number of observed crosstalk faults can be determined. The generating of the ATP, the generating of the at least one care bit, the sensitizing, and the determining can be repeated until a desired number of faults has been observed or a maximum number of repetitions has been completed, each repetition of the generating of the ATP producing a different pattern. In embodiments, the repetition can include applying an optimization algorithm to obtain a set of patterns that can detect as many crosstalk faults as possible within any constraints imposed, including time.

Figure 6:
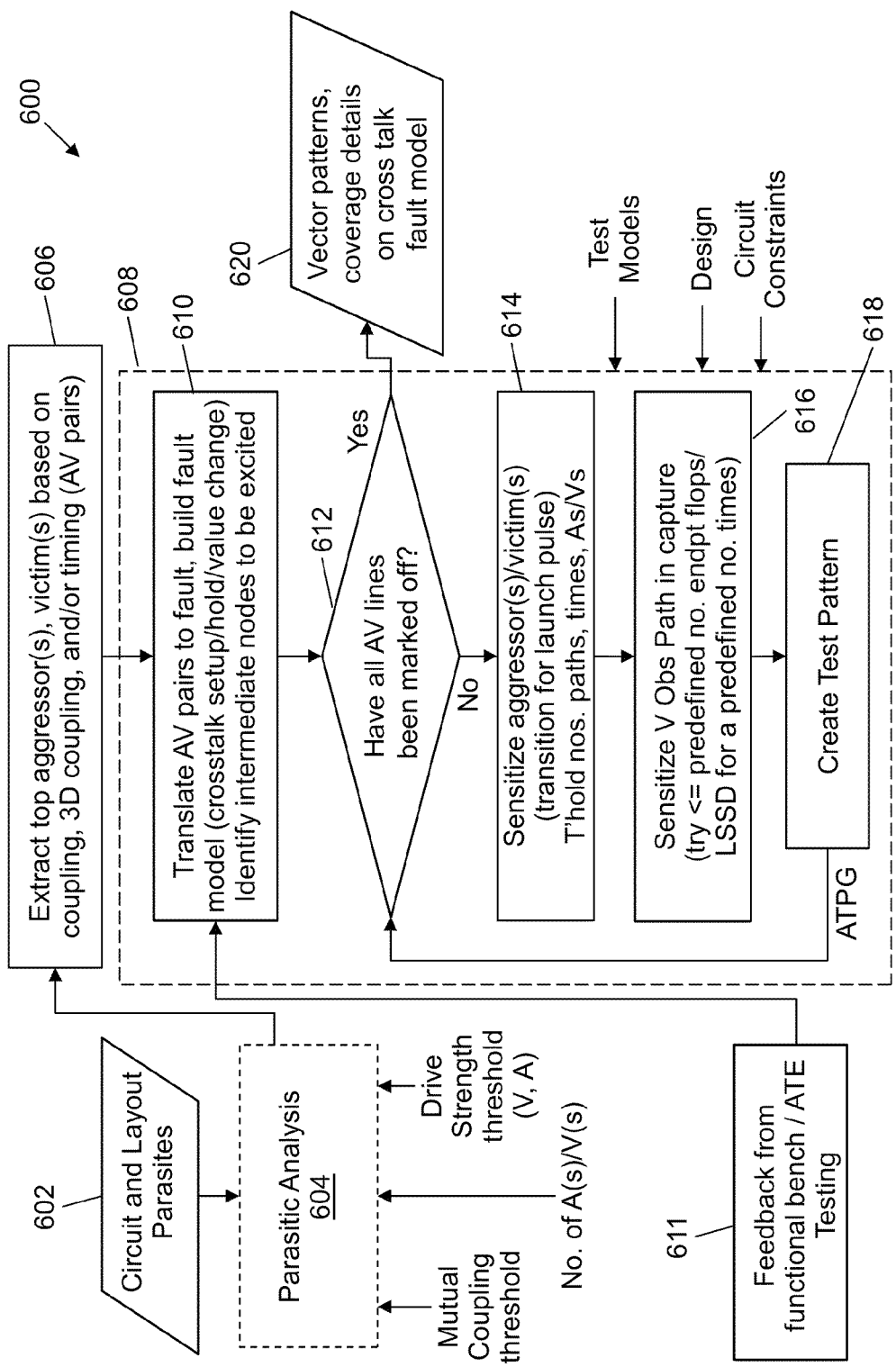
FIG. 6 is a schematic flow diagram of a method that can be implemented according to embodiments of the invention disclosed herein.

As illustrated in FIG. 6, an example of embodiments of the invention disclosed herein can be implemented as a method 600 of automatically generating test patterns for a semiconductor device designed to detect crosstalk induced faults. A list of aggressor-victim (AV) pairs of nets of a design can be generated based on a crosstalk effect criterion, such as by determining circuit and layout parasites (block 602) and performing a parasitic analysis (block 604), which can take into account mutual coupling threshold(s), a number of aggressors (A) and/or victims (V), and/or drive strength threshold. Top AV pairs can be extracted (block 606) using one or more crosstalk effect criteria, such as parasitic capacitance, relative coupling capacitance between nets, 3D coupling between dies, relative physical distance between nets, trace length along which lines of nets run together, timing, and/or driver strength threshold. An optimization routine can be implemented using the list of AV pairs (block 608), which can begin by translating each AV pair into a respective AV crosstalk fault model (block 610), which can be configured to model, for example, an AV crosstalk hold fault, an AV crosstalk setup violation, and/or an AV crosstalk value change fault. Translation can also include identifying intermediate nodes to be excited and/or switched to enable propagation and/or observation of a particular crosstalk fault, though this can also be regarded as a separate step in embodiments. Translation can additionally take into account feedback from functional bench, automatic test equipment (ATE), and/or other testing, as well as field reports and/or other reporting of relevant information (block 611).

A check can then be made to determine whether all AV lines have been marked off (block 612), and if not, the aggressor(s) and/or victim(s) can be sensitized (block 614), such as to enable a transition in preparation for a launch pulse. In addition, any victim(s) observation path(s) can be sensitized (block 616), such as to enable capture and/or observation of a given crosstalk fault. For example, each potential endpoint flop can be tried a threshold number of times, and a threshold number of such flops can be tried, each threshold being one of a minimum or a maximum number of tries, such as by using level-sensitive scan design (LSSD). Sensitizing of aggressors, victims, and/or observation paths can take into account various factors, such as test models, design of the particular circuit and/or device(s) being considered, circuit constraints, and/or other factors as may be desired and/or appropriate. Once the threshold values for sensation have been reached, a test pattern can be created (block 618), such as by ATPG, and the check of AV line mark-off can be repeated (block 612). When all AV lines have been marked off, vector patterns, coverage details, and other information about each crosstalk fault model can be stored (block 620), such as in a memory or in/on another computer readable storage medium, particularly a non-transitory computer readable storage medium.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
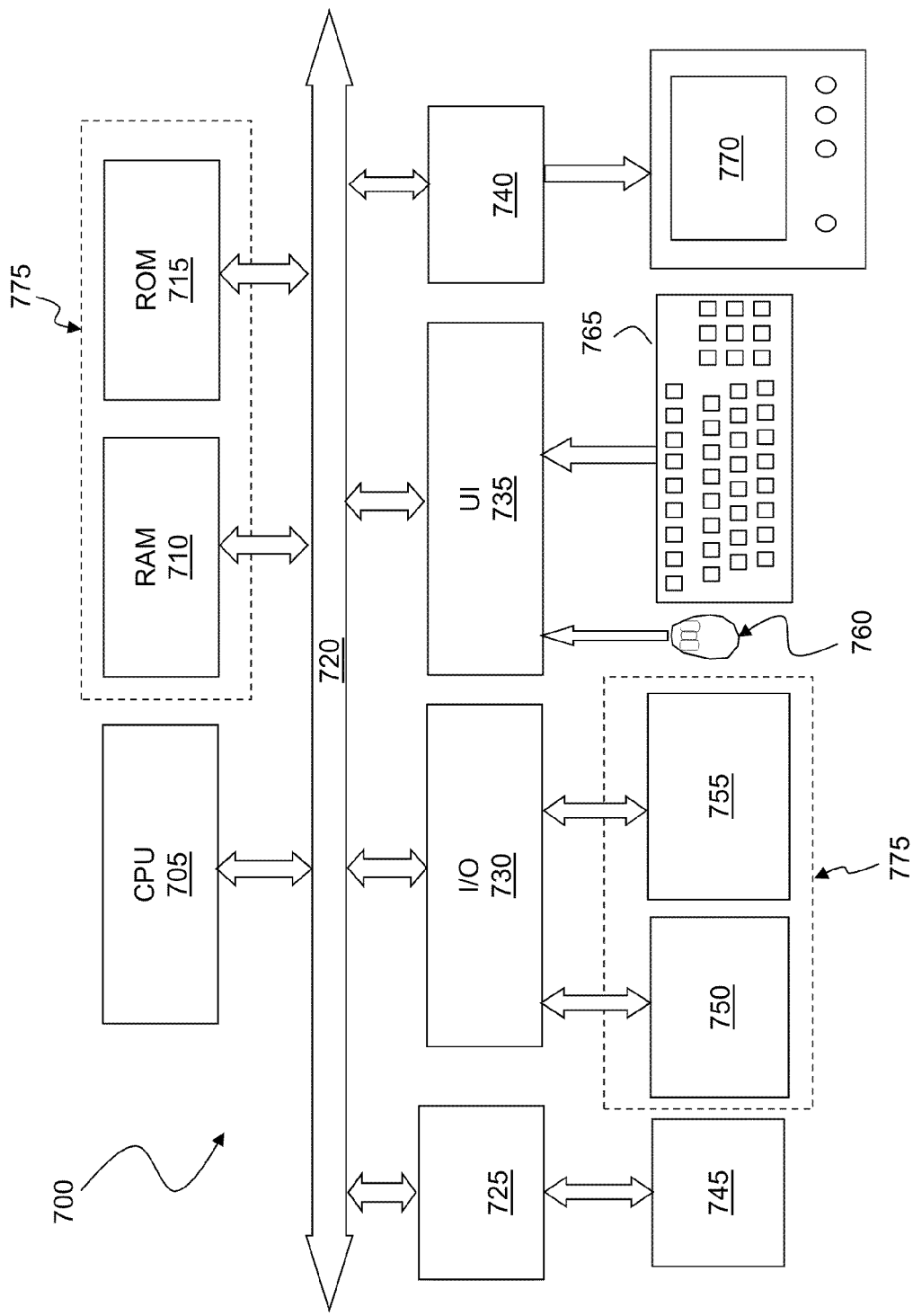
FIG. 7 is a schematic block diagram of a general purpose computer system which may be used to practice aspects of embodiments of the invention disclosed herein.

FIG. 7 shows a schematic block diagram of a general-purpose computer/system/computing device 700 that can be used to implement and/or practice the method(s) and/or system(s) described herein, which can be coded as a set of instructions on removable or hard media for use computer 700 as suggested above. Computer 700 can include at least one microprocessor or central processing unit (CPU) 705, which can also be construed as a computing device and can be interconnected via a system bus 720 to machine readable media 775. Machine readable media 775 can include, for example, a random access memory (RAM) 710, a read-only memory (ROM) 715, a removable and/or program storage device 755 and a mass data and/or program storage device 750. An input/output (I/O) adapter 730 can connect mass storage device 750 and removable storage device 755 to system bus 720. A user interface 735 can connect a keyboard 765 and a mouse 760 to system bus 720, and a port adapter 725 connects a data port 745 to system bus 720 and a display adapter 740 can connect a display device 770. ROM 715 can contain the basic operating system for computer system 700. Examples of removable data and/or program storage device 755 include magnetic media such as floppy drives, tape drives, portable flash drives, zip drives, and optical media such as CD ROM or DVD drives. Examples of mass data and/or program storage device 750 include hard disk drives and non-volatile memory such as flash memory. In addition to keyboard 765 and mouse 760, other user input devices such as trackballs, writing tablets, pressure pads, microphones, light pens and position-sensing screen displays may be connected to user interface 735. Examples of display device 770 include cathode-ray tubes (CRT) and liquid crystal displays (LCD).

A machine readable computer program may be created by one of skill in the art and stored in and/or executed by computer system 700 or a data and/or any one or more of machine readable medium 775 to simplify the practicing of this invention. In operation, information for the computer program created to run the present invention can be loaded on the appropriate removable data and/or program storage device 755, fed through data port 745 or entered using keyboard 765. A user can control the program by manipulating functions performed by the computer program and providing other data inputs via any of the above mentioned data input means. Display device 770 can provide a means for the user to accurately control the computer program and perform the desired tasks described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of automatically generating test patterns for a semiconductor device design to detect crosstalk induced faults between at least two lines in a circuit, the method comprising:
    generating, via a computer, a list of aggressor-victim (AV) pairs of nets of a design that exceed a threshold value of a crosstalk effect criterion, each AV pair including an aggressor net and a victim net, wherein the aggressor net includes an influencing line in the circuit and the victim net includes an affected line in the circuit;
    translating each AV pair into a respective AV crosstalk fault model, wherein the respective AV crosstalk fault model is configured to produce a respective signal transitioning in a respective direction for each aggressor net of each AV pair;
    generating an automated test pattern (ATP) based on the design and including at least one constraint configured to switch at least one AV crosstalk fault model;
    generating at least one care bit configured to propagate at least one AV crosstalk fault to an observation node;
    sensitizing each AV crosstalk fault model and a respective path to the observation node;
    determining whether any crosstalk fault is observed and a number of crosstalk faults observed; and
    repeating the generating of the ATP, the generating of the at least one care bit, the sensitizing, and the determining until at least one of a desired number of faults is observed or a maximum number of repetitions has been completed, each repetition of the generating of the ATP producing a different pattern.

2. The method of claim 1, wherein the crosstalk effect criterion includes parasitic capacitance, and the generating of the list of AV pairs includes obtaining a respective parasitic capacitance for each net of at least two nets in a design, determining a respective degree of a crosstalk effect between each pair of nets based on the parasitic capacitance, and adding any pair exceeding a threshold value of parasitic capacitance to the list as an AV pair.

3. The method of claim 1, further comprising identifying for each AV crosstalk fault model any respective intermediate circuit node to be switched to observe a respective crosstalk fault, each respective intermediate circuit node lying on a respective path between a respective fault location of the AV crosstalk fault model and an observation node.

4. The method of claim 3, wherein the sensitizing of a respective path of an AV crosstalk fault model includes sensitizing any respective intermediate circuit node.

5. The method of claim 1, wherein at least one AV crosstalk fault model includes an AV crosstalk hold model configured to produce a crosstalk hold.

6. The method of claim 5, wherein the at least one AV crosstalk hold model is configured to produce with each aggressor net and each victim net of the respective AV pair a respective signal transitioning in a first direction.

7. The method of claim 1, wherein at least one AV crosstalk fault model is configured to produce a crosstalk setup violation.

8. The method of claim 7, wherein each of the at least one AV crosstalk setup violation model is configured to produce with each aggressor net a respective signal transitioning in a first direction and to produce with each victim net a respective signal transitioning in a second direction opposite to the first direction.

9. The method of claim 1, wherein at least one AV crosstalk fault model is configured to produce a crosstalk value change.

10. The method of claim 9, wherein each of the at least one AV crosstalk value change model is configured to produce with each aggressor net a respective signal transitioning in a first direction and to produce with each victim net a respective substantially steady state signal.

11. The method of claim 1, wherein the first criterion includes at least one of a relative coupling capacitance between nets, a relative physical distance between nets, a trace length along which lines of nets run together, or a driver strength threshold.

12. A computer program product for detecting crosstalk related transition faults in a semiconductor design between at least two lines in a circuit, the computer program product being stored on a non-transitory computer readable storage medium and including instructions in the form of computer readable code that, when executed by a computing device, configure the computing device to:
  extract a respective parasitic capacitance for every net in the design;
  generate a list of aggressor-victim (AV) pairs of nets each exhibiting a high degree of signal cross talk based on a first criteria set, each AV pair including an aggressor net and a victim net, wherein the aggressor net includes an influencing line in the circuit and the victim net includes an affected line in the circuit;
  translate each AV pair into a respective AV fault model configured to model at least one of a crosstalk setup fault, a hold violation fault, and a value change fault wherein the respective AV crosstalk fault model is configured to produce a respective signal transitioning in a respective direction for each aggressor net of each AV pair;
  identify any intermediate circuit node to be switched to observe crosstalk faults;
  generate an automated test pattern accounting for circuit constraints to sensitize aggressor/victim pairs selected for switching;
  generate care bits to propagate the crosstalk faults to an observation node;
  sensitize each one of the plurality of aggressor/victim pairs and a corresponding victim to observation path iteratively to detect the crosstalk fault; and
  select a set of patterns generated for each one of the plurality of aggressor/victim pairs with an optimized algorithm to detect a maximum number of crosstalk faults.

13. The computer program product of claim 12, wherein each AV crosstalk fault model includes at least one of a setup fault induced delay, a setup fault induced glitch, a hold fault induced delay, a hold fault induced glitch, a value change fault, a value 0 fault, or a value 1 fault.

14. The computer program product of claim 12, wherein substantially all aggressors and respective victims identified as risks for crosstalk hold fault or crosstalk setup fault are sensitized to create a respective fault-inducing transition.

15. The computer program product of claim 12, wherein substantially all aggressors identified as risks for value change fault are sensitized for transition and respective victims are sensitized for a substantially steady value.

16. The computer program product of claim 12, wherein the first criteria set includes at least one of relative physical distance between nets, drive strength, or timing sensitive nets.

17. A system for detecting crosstalk related transition faults in a semiconductor design between at least two lines in a circuit, the system including at least one computing device connected to a non-transitory computer readable storage medium on which instructions in the form of computer readable code reside such that, when executed by a computing device, the system is configured to:
  extract a respective parasitic capacitance for every net in the design;
  generate a list of aggressor-victim (AV) pairs of nets each exhibiting a high degree of signal cross talk based on a first criteria set, each AV pair including an aggressor net and a victim net, wherein the aggressor net includes an influencing line in the circuit and the victim net includes an affected line in the circuit;
  translate each AV pair into a respective AV fault model configured to model at least one of a crosstalk setup fault, a crosstalk hold violation fault, and a crosstalk value change fault, wherein the respective AV crosstalk fault model is configured to produce a respective signal transitioning in a respective direction for each aggressor net of each AV pair;
  identify any intermediate circuit node that switched to observe crosstalk faults;
  generate an automated test pattern accounting for circuit constraints to sensitize aggressor/victim pairs selected for switching;
  generate care bits to propagate the crosstalk faults to an observation node;
  sensitize each one of the plurality of aggressor/victim pairs and a corresponding victim to observation path iteratively to detect the crosstalk fault; and
  select a set of patterns generated for each one of the plurality of aggressor/victim pairs with an optimized algorithm to detect a maximum number of crosstalk faults.

18. The system of claim 17, wherein each AV crosstalk fault model includes at least one of a setup fault induced delay, a setup fault induced glitch, a hold fault induced delay, a hold fault induced glitch, a value change fault, a value 0 fault, or a value 1 fault.

19. The system of claim 17, wherein substantially all aggressors and respective victims identified as risks for crosstalk hold fault or crosstalk setup fault are sensitized to create a respective fault-inducing transition.

20. The system of claim 17, wherein substantially all aggressors identified as risks for value change fault are sensitized for transition and respective victims are sensitized for a substantially steady value.

\* \* \* \* \*